July 5, 1949. B. H. SCHENK 2,474,917
APPARATUS FOR FORMING END CLOSURES
Filed April 19, 1946 6 Sheets-Sheet 1

*Fig. 1*

INVENTOR.
BERNARD H. SCHENK
BY
ATTORNEY.

July 5, 1949.    B. H. SCHENK    2,474,917
APPARATUS FOR FORMING END CLOSURES
Filed April 19, 1946    6 Sheets-Sheet 3

July 5, 1949.  B. H. SCHENK  2,474,917
APPARATUS FOR FORMING END CLOSURES
Filed April 19, 1946  6 Sheets-Sheet 4

INVENTOR.
BERNARD H. SCHENK
BY Wm. S. Pritchard
ATTORNEY.

July 5, 1949.  B. H. SCHENK  2,474,917
APPARATUS FOR FORMING END CLOSURES
Filed April 19, 1946  6 Sheets-Sheet 6

INVENTOR.
BERNARD H. SCHENK
BY
ATTORNEY.

Patented July 5, 1949

2,474,917

UNITED STATES PATENT OFFICE 2,474,917

APPARATUS FOR FORMING END CLOSURES

Bernard H. Schenk, Western Springs, Ill., assignor to The Visking Corporation, Chicago, Ill., a corporation of Virginia Application April 19, 1946, Serial No. 663,593

21 Claims. (Cl. 154—42)

This invention relates to an apparatus for sealing one end of a flattened tubing formed of a thermoplastic substance. More particularly, it relates to an apparatus for flame sealing one end of a flattened tubing formed of a thermoplastic material to produce a bead closure.

United States application Serial No. 623,057, filed October 18, 1945, discloses a process of sealing one end of a flattened tubing formed of a thermoplastic material to form an end closure wherein a predetermined length of tubing adjacent the end which is to be sealed is passed through the zone of action of a flame at a speed to melt the thermoplastic without combustion and without substantial carbonization. The melting of the tubing is restricted to the aforementioned predetermined length, which is sufficient to provide an amount of molten thermoplastic which will coalesce and form a bead closure upon removal from the zone of action of the flame. The fusion of the thermoplastic is restricted to the predetermined portion of the tubing by a pair of members formed of appropriate material and of such dimensions that they will confine the fusion to the material projecting forwardly thereof and conduct heat away rapidly.

In commercial bags, it is not essential for the bead closure to be at right angles to the longitudinal axis of the tubing. The bead closure can be at a slight angle to the longitudinal axis of the tubing and fully serve its purpose, since when the bag is filled with the desired contents the slight angularity of the bead closure will not be apparent. It is, however, essential that the predetermined amount of the tubing which is to be fused to form the bead closure be substantially of the same length throughout the width of the flattened tubing. When the portion of the tubing which is flame sealed is of varying length throughout the width thereof, the bead closure will not be of substantially uniform strength throughout. At those portions where a smaller quantity of material is exposed to the flame, the seal formed at such portions is weaker than that obtained when a larger amount of material is exposed to the zone of action of the flame. Indeed, sometimes the amount of tubing exposed to the action of the flame is insufficient to provide a bead closure of the necessary strength. Thus, it has been the practice to carefully position the tubing, and particularly the end which is to be sealed, as well as carefully inspect each bead closure in order to detect any bag in which the bead closure is defective.

An object of this invention is to provide a new and improved apparatus for sealing one end of a flattened container and form a bead end closure.

Another object of this invention is to provide an apparatus for sealing one end of a flattened container which assures the production of a satisfactory end closure.

An additional object of this invention is to provide an apparatus for sealing one end of a flattened tubing in which the amount of the material utilized in the production of the end closure is predetermined and of substantially the same length across the width of the tubing.

A further object of this invention is to provide an apparatus for flame sealing the end of a container to form an end closure which assures the production of a satisfactory bead seal and thus reduces inspection of the product to a minimum.

Other and additional objects will become apparent hereinafter.

The above objects are accomplished in general, by feeding a flattened tubing formed of a thermoplastic material through the zone of action of a knife which transversely severs the tubing into two sections, and then, simultaneously but separately, feeding each section so that a predetermined length of the material adjacent the cut end thereof passes through the zone of action of a fusing means, such as a flame, whereby a bead seal or end closure is produced. The tubing is secured prior to the severing action of the knife in a manner that each section, after severance of the tubing, will be secured so that the cut edge of each section is not shifted in its travel from the severing station to and through the zone of action of the flame and a predetermined uniform length of the section extending across the width of the section is exposed to the action of the flame.

One embodiment of the apparatus constituting one phase of this invention comprises a pair of rotating hollow drums of unequal diameter mounted end-to-end, with the opposing ends in spaced relationship and a portion of the peripheries of both drums lying in substantially the same curved plane. The cutting edge of a knife is disposed to lie in a line along which portions of the peripheries of both drums lie in the same plane, and extends into the space between the ends of the drums so that when a tubing is conveyed past the knife, it will be transversely severed into two sections. At a point remote to the knife, there is positioned a pair of burners so that, upon rotation of the drums, the cut end of the section carried by the small drum will be passed through the zone of action of the flame of one burner and the cut end of the section carried by the large drum will be passed through the zone of action of the flame of the other burner.

The tubing is positioned transversely on a pair of spaced conveyer belts, one of which passes around and is driven by the small drum and the other of which passes around and is driven by the large drum. Both of these belts travel in the same plane until they pass from the zone of action of the knife, and then each continues its travel over and around the respective drum. Prior to passing onto the respective drum, the tubing is secured to the conveyer belts by a pair of securing belts, one cooperating with each conveyer belt, and which travel in the same path as the conveyer belt with which it cooperates until they are separated to release the tube section in which the cut end had been sealed. The conveyer and securing belts are of a width less than the drums.

In order to restrict the action of the flame to a predetermined length of the section, adjacent the cut end there is provided a pair of endless steel tapes, one of which is directed onto and cooperates with the small drum and the other of which is directed onto and cooperates with the large drum. The tapes engage the tubing as it passes onto the drums and are disposed on opposite sides of the knife in position to engage the respective sections at a predetermined distance from the cut end thereof. Each tape travels with the drum it cooperates with, and its position relative to the cut edge of the section engaged thereby is maintained substantially constant throughout its travel, with the result that a substantially uniform predetermined length of the section adjacent the cut end is subjected to the action of the flame. The tapes and the drums also constitute the means which confine the fusion of the tube material to the portion exposed to the action of the flame.

The present invention will be more clearly understood by reference to the following detailed description when taken in conjunction with the accompanying drawings in which.

Figure 4:
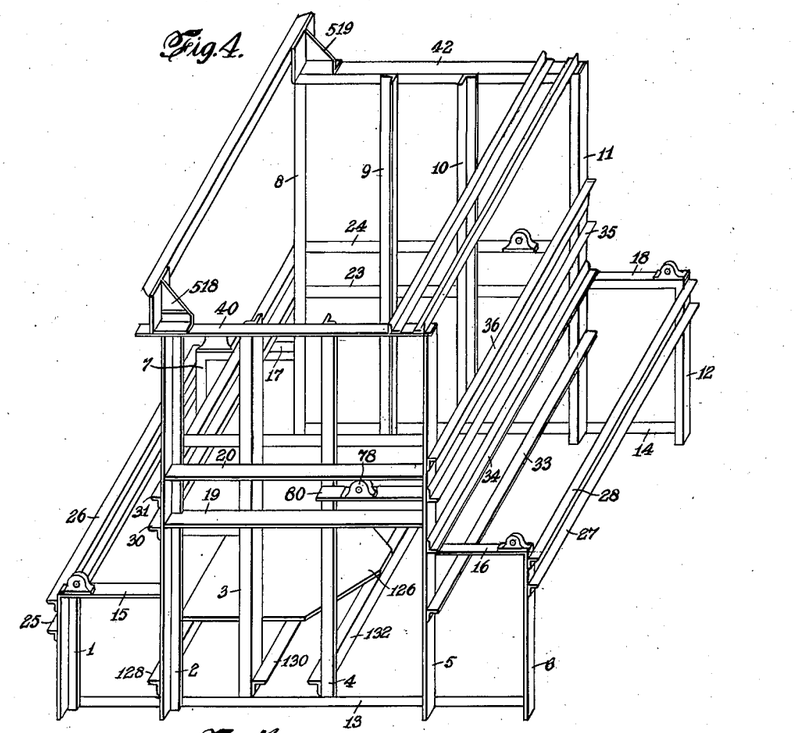
Figure 4 is a perspective view of the frame of the machine.

Referring now to the drawings wherein like reference numerals designate like parts, and particularly to Figure 4 wherein there is disclosed an angle iron frame on which the mechanisms of the apparatus are mounted, the reference numerals 1, 2, 3, 4, 5, 6, 7, 8, 9, 10, 11 and 12 designate vertical members. The vertical members 1, 2, 3, 4, 5 and 6 are secured adjacent the bottom thereof by a cross-piece 13; and vertical members 7, 8, 9, 10, 11 and 12 are similarly secured together by a cross-piece 14. The vertical member 1 is secured by a cross-piece 15 to the upright 2. The vertical member 6 is secured to the upright 5 by a cross-piece 16. The vertical member 7 is secured to the upright 8 by a cross-piece 17. The vertical member 12 is secured to the upright 11 by a cross-piece 18. Cross-pieces 19 and 20 secure the vertical members 2, 3, 4 and 5. Similar cross-pieces 23 and 24 secure the vertical members 8, 9, 10 and 11 together. The vertical members 1 and 7 are secured together by a pair of cross-pieces 25 and 26. Vertical members 6 and 12 are secured together by cross-pieces 27 and 28. Vertical members 2 and 8 are secured together by cross-pieces 30 and 31. Vertical members 5 and 11 are secured together by cross-pieces 33, 34, 35, and 36. The cross-piece 34 also secures the cross-pieces 16 and 18. Cross-piece 40 secures the vertical members 2, 3, 4 and 5 at the top thereof, and cross-piece 42 secures the vertical members 8, 9, 10, and 11 at the top thereof.

Figure 1:
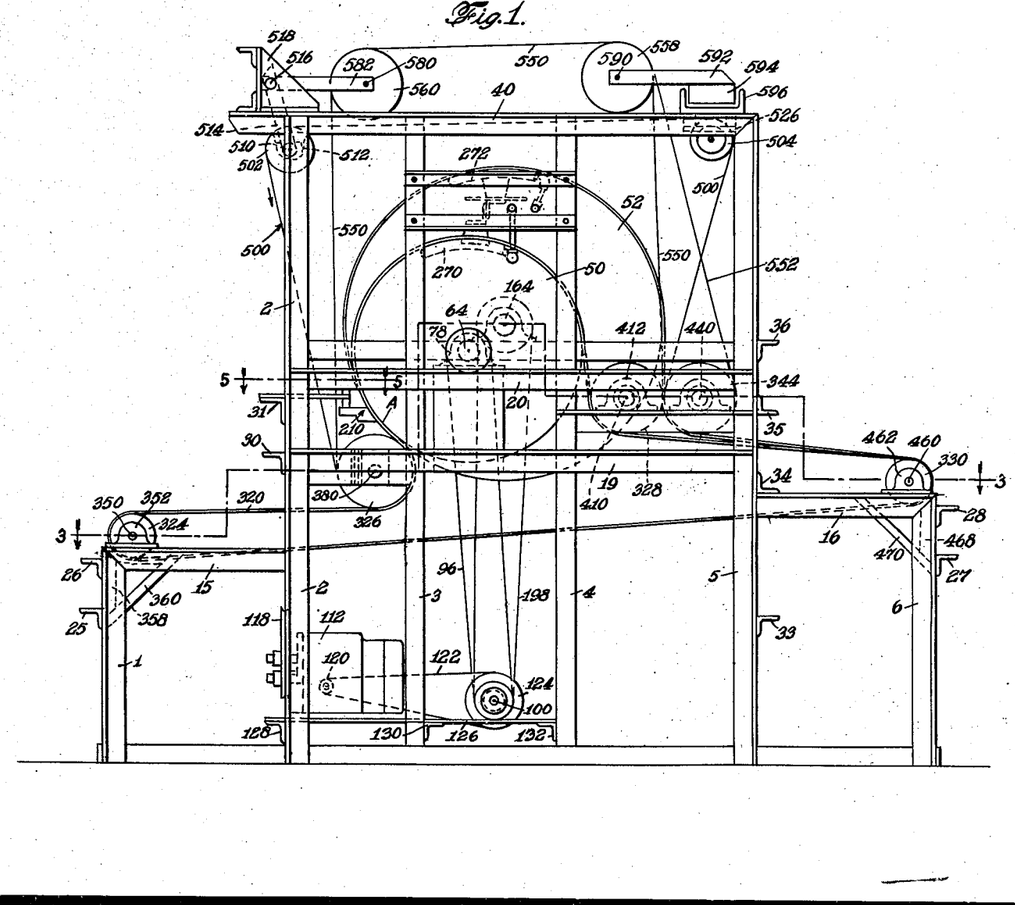
Figure 1 is a side elevation of a flame sealing machine embodying the principles of this invention.
Figure 2:
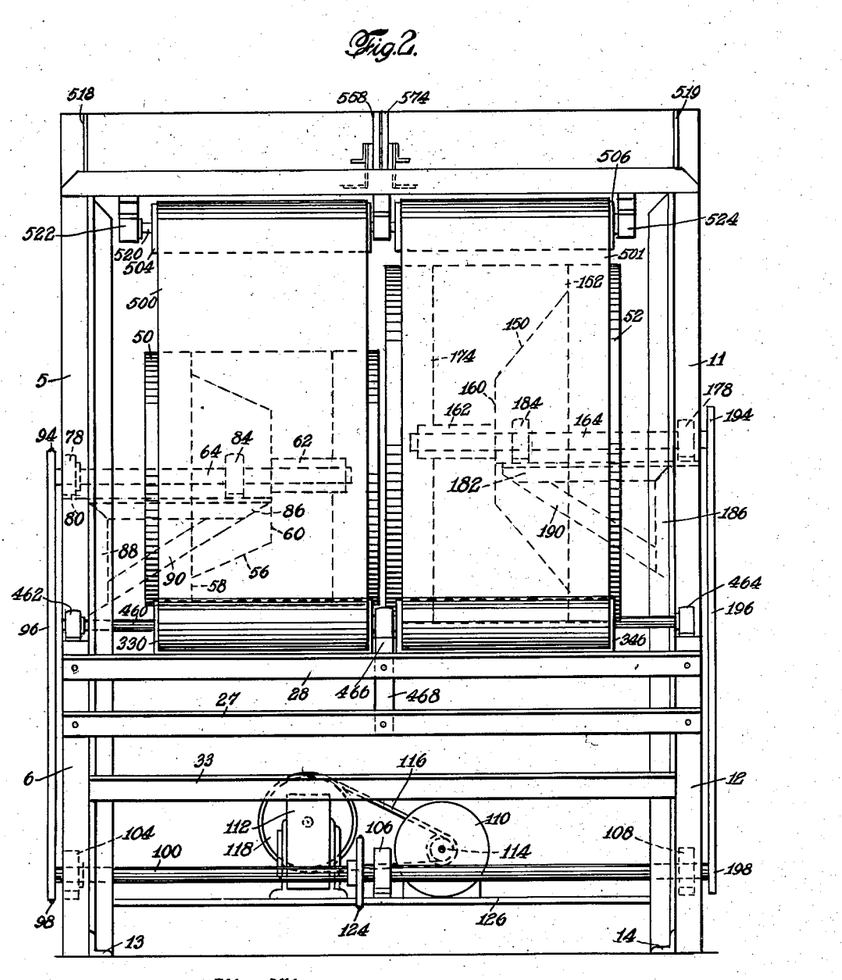
Figure 2 is an end elevation of the machine.
Figure 2A:
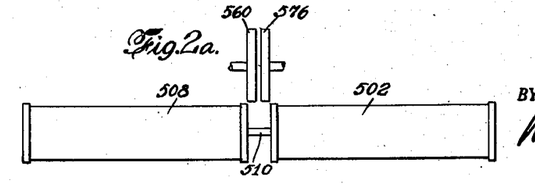
Figure 2A is a fragmentary view of the securing belt rolls and the tape wheels at the left end of the machine.
Figure 3:
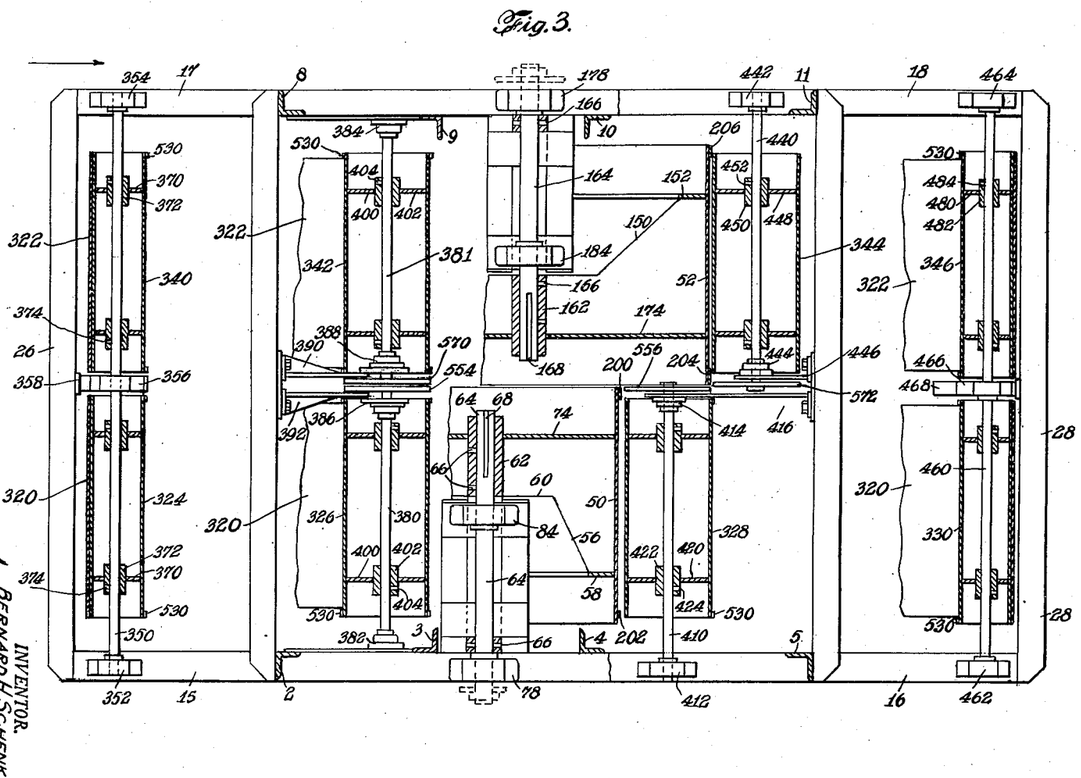
Figure 3 is a section taken on line 3—3 of Figure 1.

Referring now to Figures 1, 2 and 3, the reference numerals 50 and 52 designate a small hollow cylindrical drum and a large hollow cylindrical drum, respectively. In the interior of the drum 50, there is a hollow (conical) frustum 56 which is open at the rear thereof and which is provided at the rear edge thereof with an annular flange which, in turn, is secured, as by welding, to the inner peripheral wall of the drum. The frustum 56 is provided at its forward end with a head 60 having a central bore through which a sleeve 62 extends. The head 60 is secured, as by welding, to the sleeve 62 which is, in turn, secured, as by set screws 66 and a key 68, to a shaft 64 extending in and centrally disposed relative to the drum 50. The inner ends of spokes 74 are secured to the sleeve 62 forwardly of the frustum 56 and adjacent the free end of the shaft 64. The outer ends of the spokes are secured in any appropriate manner, as by welding, to the inner peripheral wall of the drum 50 and in spaced relationship to the end of said drum. It is thus apparent that upon rotation of the shaft 64, the drum 50 will be rotated therewith.

The shaft 64 is, adjacent its drive end, rotatably mounted in a pillow block 78 carried on a shelf 80 secured to the uprights 4 and 5 (see Figure 4). The shaft 64 is also rotatably mounted intermediate its ends and, in the interior of the frustum 56 (see Figures 2 and 3), in a bearing 84 mounted on a bracket 86 in which a vertical member 88 is secured to the frame members 19 and 20. A brace 90 strengthens and reinforces the bracket.

As shown in Figures 1 and 2, a sprocket 94, keyed to the drive end of the shaft 64, is driven by a chain 96 which, in turn, is driven by a sprocket 98 on a shaft 100 which is rotatably mounted in bearings 104, 106 and 108 appropriately mounted on the frame and driven by a motor 110 through a speed reducer 112. In the form shown (see Figures 1 and 2), the motor shaft carries a pulley 114 which, through belt 116, drives a pulley 118 on the input shaft of the speed reducer 112. The output shaft of the speed reducer carries a sprocket 120 which, through a chain 122, drives a sprocket 124 keyed to the shaft 100. The motor 110 and the speed reducer 112 are positioned on a shelf 126 which is carried on cross-pieces 128, 130 and 132.

The large drum 52 is mounted and driven in a manner similar to the small drum 50. Referring now to Figures 1, 2 and 3, in the interior of the drum 52, a hollow (conical) frustum 150, open at the rear thereof, is formed at the rear edge with an annular flange 152 which is secured, as by welding, to the inner peripheral wall of the drum 52. The frustum 150 is provided on its forward end with a head 160 having a central bore through which a sleeve 162 extends. The head 160 is secured, as by welding, to the sleeve 162 which, in turn, is secured by set screws 166 and a key 168 to a shaft 164 extending in and centrally disposed relative to the drum 52. The inner ends of spokes 174 are secured to the sleeve 162 forwardly of a frustum 156 and adjacent the free end of the shaft 164. The outer ends of the spokes 174 are secured in any appropriate manner, as by welding, to the inner peripheral wall of the drum 52, and in spaced relationship to the end of said drum. It is thus manifest that upon rotation of the shaft 164, the drum 52 will be rotated therewith.

The shaft 164, adjacent its drive end, is rotatably mounted in a pillow block 178 mounted on the cross-piece 24 (see Figure 4). The shaft 164 is also rotatably mounted intermediate its ends, and in the interior of the frustum 150, in a pillow block 184 mounted on a shelf 182 in which the vertical member 186 is secured to the frame members 23 and 24. A brace 190 strengthens and reinforces the bracket.

As shown in Figures 1 and 2, a sprocket 194, keyed to the drive end of the shaft 164, is driven by a chain 196 which, in turn, is driven by a sprocket 198 on the shaft 100.

Due to the manner of rotating the drums 50 and 52, they will both rotate in the same direction.

As is shown in Figure 2, the shafts 64 and 164 are mounted in the apparatus so that they lie in different, but parallel, horizontal planes and extend in opposite directions with the respective free ends thereof extending inwardly of the apparatus whereby the respective drums 50 and 52 carried thereby are disposed horizontally in end-to-end spaced relationship with a portion of the peripheries of both of the drums 50 and 52 lying in substantially a common plane, which is designated by the reference character A in Figure 1. Due to the manner of mounting the drums, even upon rotation thereof the portions of the peripheries of both of the drums passing through zone A will always be in alignment and in the same plane along at least one line.

For reasons which will become apparent, the drum 50 is provided adjacent the peripheral edges thereof with belt guides 200 and 202 which extend over the entire periphery thereof, and the drum 52 is similarly provided with belt guides 204 and 206. As shown in Figure 3, the outer edge of each guide 200 and 204 is in alignment with the adjacent peripheral edge of the respective drum.

Figure 9:
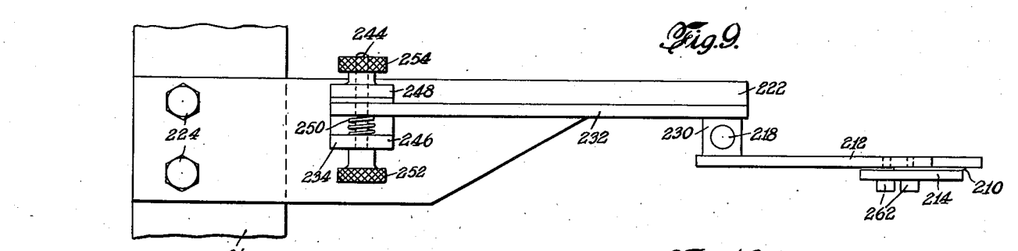
Figure 9 is a top plan view of the knife and support therefor.
Figure 10:
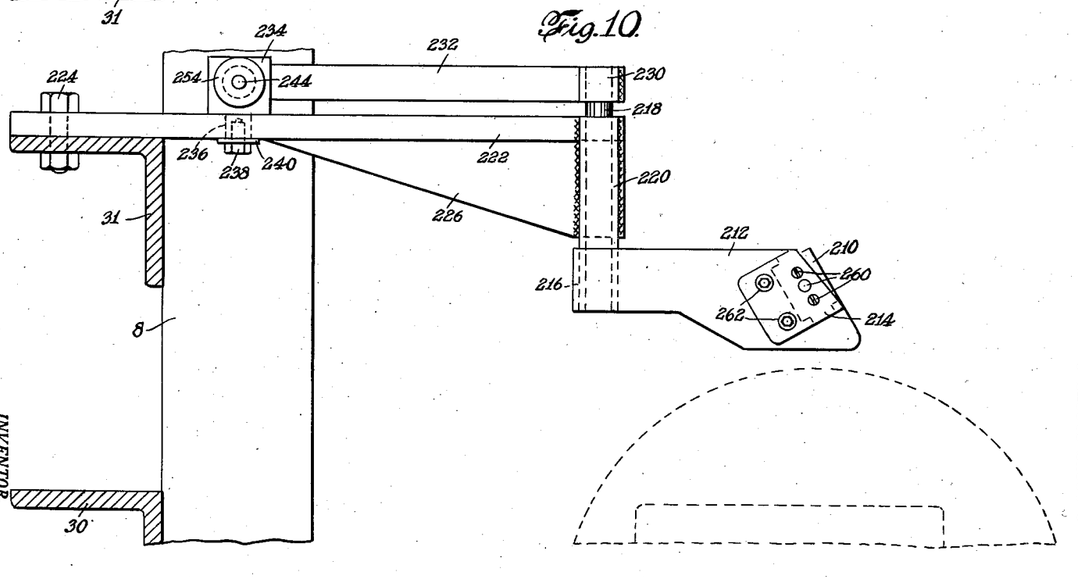
Figure 10 is a side elevation of the knife and support therefor.

A knife 210 is adjustably positioned in the space between the opposed ends of the drums 50 and 52 in zone A so that, when a tubing disposed transversely on both of the drums, as hereafter described, is conveyed through zone A, it will be severed into two sections by the knife as it passes through the zone of action of the knife. In the embodiment as shown, the cutting edge of the knife protrudes between the drums. The knife 210 is removably secured to an adjustable knife holder 212 by a clamp 214. Referring now to Figures 9 and 10, where the details of construction of one form of knife holder are shown, the reference numeral 216 designates a boss, at the rear of the knife holder 212, in which one end of a cylindrical post 218 is secured. The post 218 extends through and is movably (both slidably and rotatably) mounted in a journal 220 carried at the forward end of a bracket 222 which is secured adjacent its rear end by bolts 224 to the cross-piece 31. The bracket 222 is provided with a reinforcing rib 226. The top end of the post 218 is secured in a boss 230 carried at one end of a lever 232. The other end of the lever 232 is pivotally secured in a yoke 234.

The yoke 234 is provided with a stem 236 which is positioned in a hole in the bracket 222. A screw 238, which cooperates with a tapped hole in the stem 236 and a washer 240, secures the yoke in position on the bracket.

The lever 232 has a tapped hole through which a screw 244 extends. The screw 244 also extends through the upstanding members 246 and 248 of the yoke. A spring 250 is positioned about the screw 244 and intermediate the yoke member 246 and the lever 232. The screw 244 is provided with a knurled head 252 at one end thereof. At its opposite end, the screw 244 cooperates with a knurled nut 254. It is obvious that, upon rotation of the knurled head 252 in the proper direction, the lever 232 will be actuated and the motion thereof will be translated and transmitted to the knife holder whereby the knife will be adjusted in proper position.

Preferably, the knife 210 is positioned in the holder so that the center of the cutting edge thereof is in line with the outside diameter of guides 204 and 206 and protrudes between the drums.

In the form shown (Figures 9 and 10), the knife 210 consists of a double edge safety razor blade of the standard type which has three perforations connected by slots. The knife holder 212 is provided adjacent its forward edge with three pins 260 which are designed to cooperate with correspondingly disposed perforations in the razor blade 210. The knife clamp 214 consists of a plate having three holes which are designed to cooperate with each of the respective pins 260 when the clamp 214 is positioned on the holder 212. Bolts 262 secure the clamp 214 to the holder 212.

The respective forward edges of the holder 212 and the clamp 214 are of contours which permit the center of the cutting edge of the blade 210 to protrude between the drums 50 and 52 respectively.

In general, the knife 210 is positioned in the space in zone A so that when a tubing is conveyed therethrough, it will be severed into two sections, the cut end of each section protruding a predetermined length from the end of the respective drums. Upon rotation of the drums, and as will hereafter become apparent, each drum separately conveys the cut section thereon through the zone of action of an open flame whereby the cut end is flame sealed. The cut edge of the section carried by drum 50 is passed, upon rotation of the drum, through an open flame supplied by an arcuate burner 270 and which is positioned in the path of travel of the cut end of the section carried by the drum 50. The cut edge of the section carried by the drum 52 is passed, upon rotation of the drum, through the zone of action of an open flame provided by an arcuate burner 272 and in the path of travel of the cut end of the section carried by the drum 52.

Figure 5:
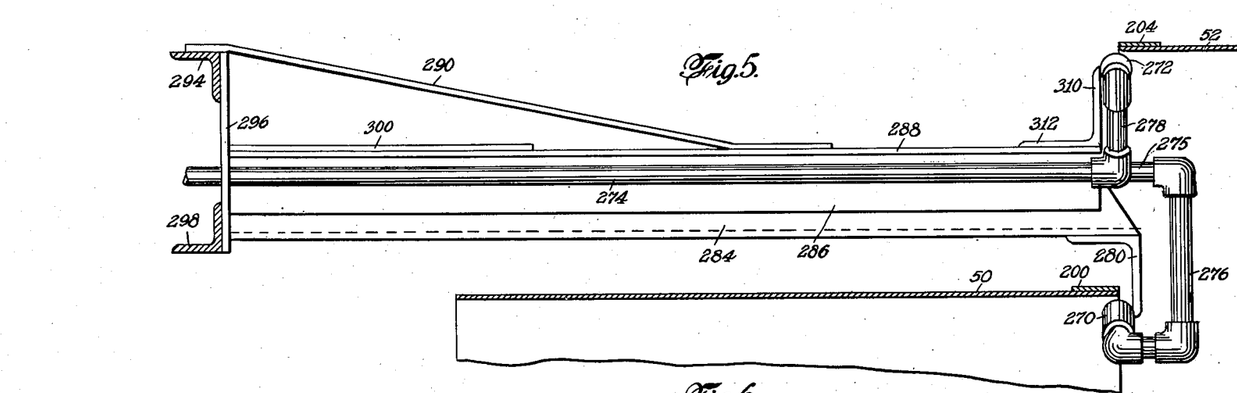
Figure 5 is an end elevation, partly in section, illustrating the burners and mounting thereof.
Figure 6:
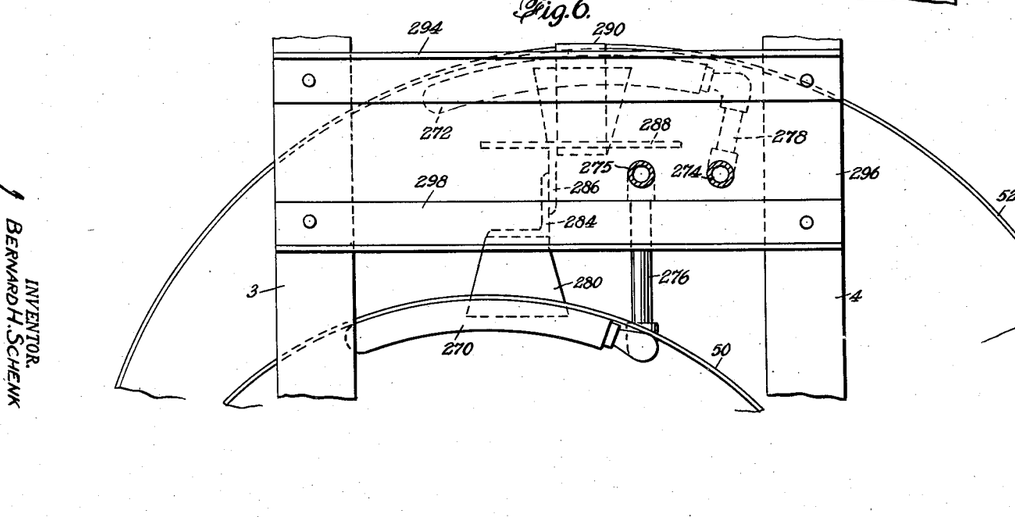
Figure 6 is a side elevation illustrating the arrangement and mounting of the burners.
Figure 7:
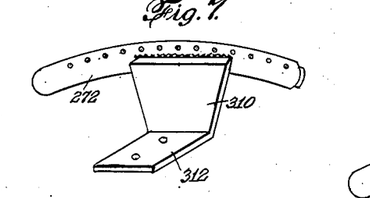
Figures 7 and 8 are perspective views of the two burners.
Figure 8:
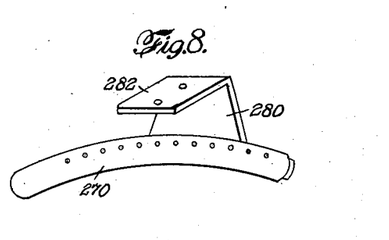

The fuel, such as gas, previously mixed with air, is fed through a feed pipe 275 from which it is conducted by suitable fittings, generally designated by the reference numeral 276, to the burner 270. The gas is conducted from a feed pipe 274 by fittings, generally designated by the reference numeral 278, to the burner 272.

The burner 270 is secured to the vertical leg 280 of a bracket, and the horizontal member 282 thereof is secured to an angle 284 which, in turn, is secured to an angle 286. The angle 286 is secured to a plate 288 supported at one end of a strap 290, the other end of the strap being secured to a cross-piece 294 carried on vertical members 3 and 4. The plate 288 is also secured, as by welding, to a plate 296 carried by the cross-pieces 294 and 298. The plate 288 is secured to a reinforcing plate 300, one end of which is also secured to the plate 296.

The burner 272 cooperating with the large drum 52 is secured at the top of a vertical member 310 of a bracket. The horizontal member 312 of the bracket is secured to the plate 288.

The apparatus is provided with means to convey the tubing to the station where it is transversely severed and thereafter maintain each cut section on the respective drum so that the cut ends thereof will be passed through the zone of action of the respective burners and finally discharge the containers with the flame-sealed ends. In the embodiment of the invention disclosed, there is provided a pair of endless conveyer belts 320 and 322. The conveyer belt 320 passes around a roll 324, thence about a roll 326, from which it passes around the drum 50. Upon leaving the drum 50, the conveyer belt 320 passes under a roll 328, from which it passes to a roll 330 and back to roll 324. The conveyer belt 322 passes over a roll 340, from which it passes over a guide roll 342 and thence around and over the drum 52. On leaving the drum 52, the conveyer belt 322 passes around roll 344, from which it passes over roll 436 and thence back to roll 340.

The rolls 324 and 340 are positioned in spaced end-to-end relationship and are rotatably mounted on a horizontal shaft 350, the opposite ends of which are respectively rotatably mounted in pillow blocks 352 and 354 positioned on the cross-pieces 15 and 17 respectively of the frame. The shaft 350 is also rotatably supported intermediate its ends by a pillow block 356 carried on a bracket 358 appropriately mounted in the machine (see Figure 1). The bracket 358 is also provided with a reinforcing brace 360.

As shown in Figure 3, the rolls 324 and 340 are hollow and the inner peripheral wall of each is secured, as by welding, to the outer ends of spokes 370 carried by hubs 372 which are appropriately secured, as by set screws 374, to the shaft 350.

Roll 326 is mounted on shaft 380 which is rotatably mounted in end bearings 382 and 386. End bearing 386 is supported on bracket 392 appropriately secured to the cross-pieces 30 and 31. Roll 342 is mounted on shaft 381 which is rotatably mounted in end bearings 384 and 388. End bearing 388 is supported on bracket 390 appropriately secured to the cross-pieces 30 and 31. It is to be noted that shafts 380 and 381 are in alignment. Rolls 326 and 342 are hollow and the inner peripheral wall of each is secured, as by welding, to the outer ends of spokes 400 carried by hubs 402 which are appropriately secured, as by set screws 404, to the shafts 380 and 381 respectively.

Roll 328 is secured to shaft 410, which is rotatably mounted at one end in a pillow block 412 appropriately mounted in the machine and also rotatably mounted in a bearing 414 adjacent its other end. The bearing 414 is carried by a bracket 416 appropriately mounted in the machine. Roll 328 is hollow and the inner peripheral wall thereof is secured, as by welding, to the outer ends of spokes 420 carried by hubs 422 secured, as by set screws 424, to the shaft 410.

Roll 344 is mounted on a shaft 440, one end of which is rotatably mounted in a pillow block 442 appropriately positioned on the frame and, adjacent the other end, rotatably mounted in a bearing 444 which is carried on a bracket 446 appropriately mounted in the machine. Roll 344 is hollow and the inner peripheral wall thereof is secured, as by welding, to the outer ends of spokes 448 carried by hubs 450 secured, as by set screws 452, to the shaft 440.

Rolls 330 and 346 are disposed in end-to-end spaced relationship, and both are mounted on a shaft 460, the ends of which are rotatably mounted in pillow blocks 462 and 464 carried by the cross-pieces 16 and 18 respectively of the frame. The shaft 460 is also supported intermediate its ends and between the drums by a pillow block 466 carried by a bracket 468 appropriately mounted in the machine. A brace 470 strengthens the bracket. Rolls 330 and 346 are hollow and the inner peripheral wall of each is secured, as by welding, to the outer ends of spokes 480 carried on hubs 482 secured, as by set screws 484, to the shaft 460.

Rolls 324 and 340 are at the feed end of the machine, and the conveyer belts 320 and 322, upon leaving the respective rolls, travel in a substantially horizontal plane until they engage rolls 326 and 342 respectively.

As shown in Figure 1, rolls 326 and 342 are positioned substantially tangentially to drums 50 and 52 respectively so that, as the conveyer belts 320 and 322 (and the securing belts and tapes hereafter described) pass therefrom, they will pass onto the drums 50 and 52 respectively at the beginning of zone A.

A pair of endless securing belts 500 and 501 are provided to cooperate with each of belts 320 and 322 respectively. As shown in Figure 1, the securing belt 500 passes from a roll 502 onto roll 326 and thence around drum 50. Upon leaving drum 50, the securing belt 500 passes about roll 328 and thence upwardly over to roll 504 and thence back to roll 502.

The securing belt 501 which cooperates with belt 322 passes around roll 342 and thence around drum 52. Upon leaving the drum 52, the belt 501 passes, together with belt 322, around roll 344, from which it passes to roll 506, and thence back to roll 508.

Rolls 502 and 508 are mounted on a shaft 510 rotatably mounted in pillow blocks 512 carried at one end of arms 514, the other ends of the arms being mounted on a rod 516 which is disposed in gussets 518 and 519 carried on the cross-pieces 40 and 42 respectively at the top of the frame.

Rolls 504 and 506 are mounted on a shaft 520, the ends of which are rotatably mounted in pillow blocks 522 and 524 carried by a cross-piece 526 at the top of the frame.

As is apparent from the foregoing description, the securing belt 500 is, during its operative flight, superimposed on the conveyer belt 320, and the securing belt 501 is similarly disposed on the conveyer belt 322.

Guides 530 are provided on the opposite ends of each of rolls 324, 326, 328, 330, 340, 342, 344 and 346 to cooperate with the edges of the respective conveyer belts and securing belts passing over such rolls to prevent lateral shifting of such belts. It is to be noted that the guiding edge of the guides 530 on the rolls 326, 328, 342 and 344 are in alignment with the respective guides 200, 202 and 204, 206 on drums 50 and 52 respectively.

The conveyer belts 320 and 322 and the securing belts 500 and 501 respectively cooperating therewith are formed of rubberized canvas or similar material and are driven through the rotation of the drums 50 and 52. As shown in Figure 3, roll 326 is of a width less than drum 50, and similarly roll 342 is of a width less than drum 52.

When a tubing is positioned transversely on the conveyers 320 and 322 at the feed end of the machine and such tubing is fed through the zone of action of the knife 210, it will be apparent that a portion of each of the sections after severance will lie on and protrude beyond the edge guides 200 and 204 of the drums 50 and 52 respectively. In order to confine the zone of action of each of the flames to a predetermined amount of the tubing, there is provided a pair of endless steel tapes 550 and 552. Endless tape 550 passes over a flanged wheel 554 mounted on shaft 380 and thence over drum 50. In this passage, tape 550 is disposed on guide 200, the outer edges of such tape and guide being in alignment. From drum 50, tape 550 passes over a flanged wheel 556 which is mounted on shaft 410. From flanged wheel 556, the tape 550 passes over a flanged roll 558 and thence to another flanged roll 560, from which it passes to flanged wheel 554.

Endless tape 552 passes over a flanged wheel 570 which is mounted on shaft 381. From wheel 570, tape 552 passes onto drum 52. In its passage over drum 52, tape 552 is superimposed on the belt guide 204 and the outer edges thereof are in alignment. From the drum 52, tape 552 passes over a flanged wheel 572 on the shaft 440. From the flanged wheel 572, the tape 552 passes to a flanged wheel 574 and thence to a flanged wheel 576, from which it passes as previously described.

The flanged tape wheels 560 and 576 are mounted on a rotatable pin 580 carried in a pair of arms 582 supported on the rod 516. Flanged rolls 558 and 574 are carried on a rotatable pin 590 mounted in a pair of arms 592 which are carried on a cross-piece 594 secured in a channel 596 at the top of the machine.

The conveyers 320 and 322, the securing belts 500 and 501 and the endless tapes 550 and 552 may have associated therewith belt tighteners of the usual type.

It is to be noted that each set of conveyer belts, securing belts and steel tapes are disposed on opposite sides of the severing knife and that, prior to the severing of a tubing, the tubing is secured between the conveyer belt and the securing belt cooperating therewith as well as between the respective drum and the steel tape cooperating therewith, and such conditions are maintained until the section leaves the respective drum, at which time the securing belts separate from the conveyer belts and permit the end-sealed section to be discharged from the conveyer belts. The ends of the drums 50 and 52 are spaced from each other a distance so that, when a tubing disposed thereon is severed as it passes through the zone of action of the knife, which is preferably positioned centrally of the space between the drums, there will be provided a predetermined length of the cut section which projects beyond the lined edges of the respective guide and tape cooperating therewith on each drum and which, when passed through the zone of action of the respective burners, will fuse to form a bead end closure. The amount that the cut end of the section protrudes is uniform over the entire width of the cut tube and is such as is required to form an end or bead seal upon fusion by the flame.

The drums 50 and 52 are rotated at such speed that the respective sections carried thereby will be conveyed at the same linear speed, which is correlated with the length and temperature of the flame to form a proper end seal without combustion and without carbonization.

The burners are preferably spaced from the knife and are so disposed relative to the drums that a tube section passing through the zone of action thereof will be retained in secured position on the respective drum until the fused portion constituting the end closure has set.

From the foregoing, it is manifest that the amount of each section of the tubing which is passed through the zone of action of the open flame is predetermined. The fusion of this predetermined length of tubing, which is uniform across the entire width of the cut section, is restricted thereto by the cooperation of the respective steel tape and the guide on the drum. The width and thickness of the steel tapes are of such dimensions as will dissipate heat rapidly.

The drums 50 and 52 and the guides thereon are made of any appropriate material which will conduct heat away rapidly. Due to the size and the small amount of the drums exposed to the flame, the heat of the flame which might impinge thereon is conducted away rapidly, even when the drums are formed of cast iron.

The invention is applicable to flame sealing of one end of collapsed or flattened tubing, either seamless or not, and with or without plications, and formed of a thermoplastic material of the type and nature disclosed in application Serial No. 623,057.

Though in the preferred embodiment the end closure is obtained by fusion of the protruding ends of superimposed plies of the flattened tubing by open flames, the invention is not restricted thereto. Other means for effecting fusion of the protruding ends of the superposed plies of the flattened tubing, such as by infra red rays, high frequency heat waves, etc., can be used.

It is to be noted that a length of tubing is disposed on the conveyors 320 and 322 at the feed end of the machine (between rolls 324, 326 and 340, 342) so that, when it is transversely severed by the knife, it will provide two sections of either the same or different lengths, as desired, and which upon sealing will form two containers. Means may be associated with the conveyors 320 and 322 at the feed end of the machine so that a tubing can be appropriately positioned thereon to produce cut sections of the desired lengths. It is to be noted that when the securing belts and the tapes pass from cooperative relationship with the belts 320 and 322, the now sealed containers are conveyed by the conveyor belts and are discharged into a suitable receptacle when the belts pass over rolls 330 and 346.

The instant invention provides a method wherein a tubing is transversely cut into two sections and thereafter each section is separately fed through the zone of action of a different flame in a manner that the cut edge of each section is not shifted in its course of travel from the severing station to and through the zone of action of the flame. This assures exposure of a predetermined uniform length of the section extending over the entire width of the section to the action of the respective flames.

Since it is obvious that various changes and modifications may be made in the above description without departing from the nature and spirit thereof, this invention is not restricted thereto except as set forth in the appended claims.

I claim:

1. An apparatus for forming an end closure comprising a pair of rotating drums of unequal diameter mounted end-to-end in spaced relationship with a portion of the peripheries of both drums lying in substantially the same plane, a knife having its cutting edge disposed in the zone wherein portions of both peripheries of the drums lie, means to feed a flattened thermoplastic tubing through the zone of action of said knife whereby two cut sections are obtained, means securing each section to the respective drum with the cut end protruding from the end of the drum for a predetermined length which is substantially uniform across the entire width of said section, means in the path of travel of the protruding end of the cut section on one drum to fuse said end, and means in the path of travel of the protruding end of the cut section on the other drum to fuse said end.

2. An apparatus for forming an end closure comprising a pair of rotating drums of unequal diameter mounted end-to-end in spaced relationship with a portion of the peripheries of both drums lying in substantially the same plane, a knife having its cutting edge disposed in the zone wherein portions of both peripheries of the drums lie, means to feed a flattened thermoplastic tubing through the zone of action of said knife whereby two cut sections are obtained, means securing each section to the respective drum with the cut end protruding from the end of the drum for a predetermined length which is substantially uniform across the entire width of said section, means in the path of travel of the protruding end of the cut section on one drum to fuse said end, means in the path of travel of the protruding end of the cut section on the other drum to fuse said end, and means cooperative with each end to restrict the action of the fusing means to the predetermined length of tubing exposed thereto.

3. An apparatus for forming an end closure comprising a pair of rotating drums of unequal diameter mounted end-to-end in spaced relationship with a portion of the peripheries of both drums lying in substantially the same plane, a conveyer belt and a cooperative securing belt positioned to pass over one drum, a conveyer belt and a cooperative securing belt positioned to pass over the other drum, said conveyer belts and securing belts being driven by the respective drums and disposed to permit positioning of a flattened thermoplastic tubing thereon prior to passage through the zone wherein the peripheries of both drums lie in the same plane, a knife having its cutting edge disposed in said zone to sever the tubing fed past it into two cut sections, each section having its cut end protruding from the end of the drum for a predetermined length which is substantially uniform across the entire width of said section, means in the path of travel of the protruding end of the cut section on one drum to fuse said end, and means in the path of travel of the protruding end of the cut section on the other drum to fuse said end.

4. An apparatus for forming an end closure comprising a pair of rotating drums of unequal diameter mounted end-to-end in spaced relationship with a portion of the peripheries of both drums lying in substantially the same plane, a conveyer belt and a cooperative securing belt positioned to pass over one drum, a conveyer belt and a cooperative securing belt positioned to pass over the other drum, said conveyer belts and securing belts being driven by the respective drums and disposed to permit positioning of a flattened thermoplastic tubing thereon prior to passage through the zone wherein the peripheries of both drums lie in the same plane, a knife having its cutting edge disposed in said zone to sever the tubing fed past it into two cut sections, each section having its cut end protruding from the end of the drum for a predetermined length which is substantially uniform across the entire width of said section, means in the path of travel of the protruding end of the cut section on one drum to fuse said end, means in the path of travel of the protruding end of the cut section on the other drum to fuse said end, and means cooperative with each drum to restrict the action of the respective fusing means to the predetermined length of tubing exposed thereto.

5. An apparatus for forming an end closure comprising a pair of rotating drums of unequal diameter mounted end-to-end in spaced relationship with a portion of the peripheries of both drums lying in substantially the same plane, a knife having its cutting edge disposed in the zone wherein portions of both peripheries of the drums lie in the same plane, means to feed a flattened thermoplastic tubing through the zone of action of said knife whereby two cut sections are obtained, means securing each section to the respective drum with the cut end protruding from the end of the drum for a predetermined length which is substantially uniform across the entire width of said section, a burner providing an open flame in the path of travel of the protruding end of the cut section on one drum, and a second burner providing an open flame in the path of travel of the protruding end of the cut section on the other drum.

6. An apparatus for forming an end closure comprising a pair of rotating drums of unequal diameter mounted end-to-end in spaced relationship with a portion of the peripheries of both drums lying in substantially the same plane, a knife having its cutting edge disposed in the zone wherein portions of both peripheries of the drums lie in the same plane, means to feed a flattened thermoplastic tubing through the zone of action of said knife whereby two cut sections are obtained, means securing each section to the respective drum with the cut end protruding from the end of the drum for a predetermined length which is substantially uniform across the entire width of said section, a burner providing an open flame in the path of travel of the protruding end of the cut section on one drum, a second burner providing an open flame in the path of travel of the protruding end of the cut section on the other drum, and means cooperative with each drum to restrict the action of the respective flames to the predetermined length of tubing exposed thereto.

7. An apparatus for forming an end closure comprising a pair of rotating drums of unequal diameter mounted end-to-end in spaced relationship with a portion of the peripheries of both drums lying in substantially the same plane, a knife having its cutting edge disposed in the zone wherein portions of both peripheries of the drums lie in the same plane, means to feed a flattened thermoplastic tubing through the zone of action of said knife whereby two cut sections are obtained, means securing each section to the respective drum with the cut end protruding from the end of the drum for a predetermined length which is substantially uniform across the entire width of said section, a burner providing an open flame in the path of travel of the protruding end of the cut section on one drum, a second burner providing an open flame in the path of travel of the protruding end of the cut section on the other drum, and means to remove each section from the respective drum after the fused end has set to form the end closure.

8. An apparatus for forming an end closure comprising a pair of rotating drums of unequal diameter mounted end-to-end in spaced relationship with a portion of the peripheries of both drums lying in substantially the same plane, a knife having its cutting edge disposed in the zone wherein portions of both peripheries of the drums lie in the same plane, means to feed a flattened thermoplastic tubing through the zone of action of said knife whereby two cut sections are obtained, means securing each section to the respective drum with the cut end protruding from the end of the drum for a predetermined length which is substantially uniform across the entire width of said section, a burner providing an open flame in the path of travel of the protruding end of the cut section on one drum, a second burner providing an open flame in the path of travel of the protruding end of the cut section on the other drum, means cooperative with each drum to restrict the action of the respective flames to the predetermined length of tubing exposed thereto, and means to remove each section from the respective drum after the fused end has set to form the end closure.

9. An apparatus for forming an end closure comprising a pair of rotating drums of unequal diameter mounted end-to-end in spaced relationship with a portion of the peripheries of both drums lying in substantially the same plane, means to secure a flattened thermoplastic tubing to said drums in the zone where portions of both drums lie in substantially the same plane, a knife having its cutting edge disposed in said zone beyond the place where the tubing is secured to said drums whereby upon rotation of said drums the tubing will be transversely severed into two sections, means securing each section to the respective drum on which it is disposed with the cut end protruding from the end of the drum for a predetermined length which is substantially uniform across the entire width of said section, a burner providing an open flame in the path of travel of the protruding end of the cut section on one drum, and a second burner providing an open flame in the path of travel of the protruding end of the cut section on the other drum.

10. An apparatus for forming an end closure comprising a pair of rotating drums of unequal diameter mounted end-to-end in spaced relationship with a portion of the peripheries of both drums lying in substantially the same plane, means to secure a flattened thermoplastic tubing to said drums in the zone where portions of both drums lie in substantially the same plane, a knife having its cutting edge disposed in said zone beyond the place where the tubing is secured to said drums whereby upon rotation of said drums the tubing will be transversely severed into two sections, means securing each section to the respective drum on which it is disposed with the cut end protruding from the end of the drum for a predetermined length which is substantially uniform across the entire width of said section, a burner providing an open flame in the path of travel of the protruding end of the cut section on one drum, a second burner providing an open flame in the path of travel of the protruding end of the cut section on the other drum, and means cooperative with each drum to restrict the action of the respective flames to the predetermined length of tubing exposed thereto.

11. An apparatus for forming an end closure comprising a pair of rotating drums of unequal diameter mounted end-to-end in spaced relationship with a portion of the peripheries of both drums lying in substantially the same plane, means to secure a flattened thermoplastic tubing to said drums in the zone where portions of both drums lie in substantially the same plane, a knife having its cutting edge disposed in said zone beyond the place where the tubing is secured to said drums whereby upon rotation of said drums the tubing will be transversely severed into two sections, means securing each section to the respective drum on which it is disposed with the cut end protruding from the end of the drum for a predetermined length which is substantially uniform across the entire width of said section, a burner providing an open flame in the path of travel of the protruding end of the cut section on one drum, a second burner providing an open flame in the path of travel of the protruding end of the cut section on the other drum, and means to remove each section from the respective drum after the fused end has set to form the end closure.

12. An apparatus for forming an end closure comprising a pair of rotating drums of unequal diameter mounted end-to-end in spaced relationship with a portion of the peripheries of both drums lying in substantially the same plane, a conveyor belt and a cooperative securing belt positioned to pass over one drum, a conveyer belt and a cooperative securing belt positioned to pass over the other drum, said conveyor belts and securing belts being driven by the respective drums and disposed to permit positioning of a flattened thermoplastic tubing therebetween prior to passage through the zone wherein the peripheries of both drums lie in the same plane, a knife having its cutting edge disposed in said zone to sever the tubing fed past it into two cut sections, each section having its cut end protruding from the end of the drum for a predetermined length which is substantially uniform across the entire width of said section, a burner providing an open flame in the path of travel of the protruding end of the cut section on one drum, and a second burner providing an open flame in the path of travel of the protruding end of the cut section on the other drum.

13. An apparatus for forming an end closure comprising a pair of rotating drums of unequal diameter mounted end-to-end in spaced relationship with a portion of the peripheries of both drums lying in substantially the same plane, a conveyer belt and a cooperative securing belt positioned to pass over one drum in spaced relationship to the inner edge of said drum, a conveyer belt and a cooperative securing belt positioned to pass over the other drum in spaced relationship to the inner edge of said drum, said conveyer belts and securing belts being driven by the respective drums and disposed to permit positioning of a flattened thermoplastic tubing therebetween prior to passage through the zone wherein the peripheries of both drums lie in the same plane, a knife having its cutting edge disposed in said zone to sever the tubing fed past it into two cut sections, each section having its cut end protruding from the end of the drum for a predetermined length which is substantially uniform across the entire width of said section, a burner providing an open flame in the path of travel of the protruding end of the cut section on one drum, a second burner providing an open flame in the path of travel of the protruding end of the cut section on the other drum, and means cooperative with each drum to restrict the action of the respective flames to the predetermined length of tubing exposed thereto.

14. An apparatus for forming an end closure comprising a pair of rotating drums of unequal diameter mounted end-to-end in spaced relationship with a portion of the peripheries of both drums lying in substantially the same plane, a conveyer belt and a cooperative securing belt positioned to pass over one drum in spaced relationship to the inner edge of said drum, a conveyer belt and a cooperative securing belt positioned to pass over the other drum in spaced relationship to the inner edge of said drum, said conveyer belts and securing belts being driven by the respective drums and disposed to permit positioning of a flattened thermoplastic tubing therebetween prior to passage through the zone wherein the peripheries of both drums lie in the same plane, a knife having its cutting edge disposed in said zone to sever the tubing fed past it into two cut sections, each section having its cut end protruding from the end of the drum for a predetermined length which is substantially uniform across the entire width of said section, a burner providing an open flame in the path of travel of the protruding end of the cut section on one drum, a second burner providing an open flame in the path of travel of the protruding end of the cut section on the other drum, an endless tape cooperating with one drum adjacent the inner edge thereof to restrict the action of the flame to the predetermined length of tubing exposed thereto, and a second endless tape cooperating with the other drum adjacent the inner edge thereof to restrict the action of the flame to the predetermined length of tubing exposed thereto.

15. An apparatus for forming an end closure comprising a pair of rotating drums of unequal diameter mounted end-to-end in spaced relationship with a portion of the peripheries of both drums lying in substantially the same plane, a conveyer belt and a cooperative securing belt positioned to pass over one drum, a conveyor belt and a cooperative securing belt positioned to pass over the other drum, said conveyer belts and securing belts being driven by the respective drums and disposed to permit positioning of a flattened thermoplastic tubing therebetween prior to passage through the zone wherein the peripheries of both drums lie in the same plane, a knife having its cutting edge disposed in said zone to sever the tubing fed past it into two cut sections, each section having its cut end protruding from the end of the drum for a predetermined length which is substantially uniform across the entire width of said section, a burner providing an open flame in the path of travel of the protruding end of the cut section on one drum, a second burner providing an open flame in the path of travel of the protruding end of the cut section on the other drum, means to remove each pair of conveyer and cooperative securing belts from the respective drum after the end closure has set, and means to separate each securing belt from each conveyer belt to permit discharge of the product.

16. An apparatus for forming an end closure comprising a pair of rotating drums of unequal diameter mounted end-to-end in spaced relationship with a portion of the peripheries of both drums lying in substantially the same plane, a conveyer belt and a cooperative securing belt positioned to pass over one drum in spaced relationship to the inner edge of said drum, a conveyer belt and a cooperative securing belt positioned to pass over the other drum in spaced relationship to the inner edge of said drum, said conveyer belts and securing belts being driven by the respective drums and disposed to permit positioning of a flattened thermoplastic tubing therebetween prior to passage through the zone wherein the peripheries of both drums lie in the same plane, a knife having its cutting edge disposed in said zone to sever the tubing fed past it into two cut sections, each section having its cut end protruding from the end of the drum for a predetermined length which is substantially uniform across the entire width of said section, a burner providing an open flame in the path of travel of the protruding end of the cut section on one drum, a second burner providing an open flame in the path of travel of the protruding end of the cut section on the other drum, means cooperative with each drum to restrict the action of the respective flames to the predetermined length of tubing exposed thereto, means to remove each pair of conveyer and cooperative securing belts from the respective drum after the end closure has set, and means to separate each securing belt from each conveyer belt to permit discharge of the product.

17. An apparatus for forming an end closure comprising a pair of rotating drums of unequal diameter mounted end-to-end in spaced relationship with a portion of the peripheries of both drums lying in substantially the same plane, a conveyer belt and a cooperative securing belt positioned to pass over one drum in spaced relationship to the inner edge of said drum, a conveyer belt and a cooperative securing belt positioned to pass over the other drum in spaced relationship to the inner edge of said drum, said conveyer belts and securing belts being driven by the respective drums and disposed to permit positioning of a flattened thermoplastic tubing therebetween prior to passage through the zone wherein the peripheries of both drums lie in the same plane, a knife having its cutting edge disposed in said zone to sever the tubing fed past it into two cut sections, each section having its cut end protruding from the end of the drums for a predetermined length which is substantially uniform across the entire width of said section, a burner providing an open flame in the path of travel of the protruding end of the cut section on one drum, a second burner providing an open flame in the path of travel of the protruding end of the cut section on the other drum, an endless tape cooperating with one drum adjacent the inner edge thereof to restrict the action of the flame to the predetermined length of tubing exposed thereto, and a second endless tape cooperating with the other drum adjacent the inner edge thereof to restrict the action of the flame to the predetermined length of tubing exposed thereto, said endless tapes passing on the respective drum in the zone wherein portions of both of the drums lie in the same plane and in advance of said knife.

18. An apparatus for forming an end closure comprising a pair of rotating drums of unequal diameter mounted end-to-end in spaced relationship with a portion of the peripheries of both drums lying in substantially the same plane, a conveyer belt and a cooperative securing belt positioned to pass over one drum in spaced relationship to the inner edge of said drum, a conveyer belt and a cooperative securing belt positioned to pass over the other drum in spaced relationship to the inner edge of said drum, said conveyer belts and securing belts being driven by the respective drums and disposed to permit positioning of a flattened thermoplastic tubing therebetween prior to passage through the zone wherein the peripheries of both drums lie in the same plane, a knife having its cutting edge disposed in said zone to sever the tubing fed past it into two cut sections, each section having its cut end protruding from the end of the drum for a predetermined length which is substantially uniform across the entire width of said section, a burner providing an open flame in the path of travel of the protruding end of the cut section on one drum, a second burner providing an open flame in the path of travel of the protruding end of the cut section on the other drum, an endless tape cooperating with one drum adjacent the inner edge thereof to restrict the action of the flame to the predetermined length of tubing exposed thereto, and a second endless tape cooperating with the other drum adjacent the inner edge thereof to restrict the action of the flame to the predetermined length of tubing exposed thereto, said endless tapes passing on the respective drum in the zone wherein portions of both of the drums lie in the same plane and simultaneously with the conveyer and securing belts.

19. An apparatus for forming an end closure comprising a pair of rotating drums of unequal diameter mounted end-to-end in spaced relationship with a portion of the peripheries of both drums lying in substantially the same plane, a conveyer belt and a cooperative securing belt positioned to pass over one drum in spaced relationship to the inner edge of said drum, a conveyor belt and a cooperative securing belt positioned to pass over the other drum in spaced relationship to the inner edge of said drum, said conveyer belts and securing belts being driven by the respective drums and disposed to permit positioning of a flattened thermoplastic tubing therebetween prior to passage through the zone wherein the peripheries of both drums lie in the same plane, a knife having its cutting edge disposed in said zone to sever the tubing fed past it into two cut sections, each section having its cut end protruding from the end of the drum for a predetermined length which is substantially uniform across the entire width of said section, a burner providing an open flame in the path of travel of the protruding end of the cut section on one drum, a second burner providing an open flame in the path of travel of the protruding end of the cut section on the other drum, an endless tape cooperating with one drum adjacent the inner edge thereof to restrict the action of the flame to the predetermined length of tubing exposed thereto, a second endless tape cooperating with the other drum adjacent the inner edge thereof to restrict the action of the flame to the predetermined length of tubing exposed thereto, means to remove each tape and each pair of conveyer and cooperative securing belts from the respective drum after the end closure has set, and means to separate each securing belt from each conveyer belt to permit discharge of the product.

20. An apparatus for forming an end closure comprising a pair of rotating drums of unequal diameter mounted end-to-end in spaced relationship with a portion of the peripheries of both drums lying in substantially the same plane, a conveyer belt and a cooperative securing belt positioned to pass over one drum in spaced relationship to the inner edge of said drum, a conveyer belt and a cooperative securing belt positioned to pass over the other drum in spaced relationship to the inner edge of said drum, said conveyer belts and securing belts being driven by the respective drums and disposed to permit positioning of a flattened thermoplastic tubing therebetween prior to passage through the zone wherein the peripheries of both drums lie in the same plane, a knife having its cutting edge disposed in said zone to sever the tubing fed past it into two cut sections, each section having its cut end protruding from the end of the drum for a predetermined length which is substantially uniform across the entire width of said section, a burner providing an open flame in the path of travel of the protruding end of the cut section on one drum, a second burner providing an open flame in the path of travel of the protruding end of the cut section on the other drum, an endless tape cooperating with one drum adjacent the inner edge thereof to restrict the action of the flame to the predetermined length of tubing exposed thereto, a second endless tape cooperating with the other drum adjacent the inner edge thereof to restrict the action of the flame to the predetermined length of tubing exposed thereto, said endless tapes passing on the respective drum in the zone wherein portions of both of the drums lie in the same plane and in advance of said knife, means to remove each tape and each pair of conveyer and cooperative securing belts from the respective drum after the end closure has set, and means to separate each securing belt from each conveyer belt to permit discharge of the product.

21. An apparatus for forming an end closure comprising a pair of rotating drums of unequal diameter mounted end-to-end in spaced relationship with a portion of the peripheries of both drums lying in substantially the same plane, a conveyer belt and a cooperative securing belt positioned to pass over one drum in spaced relationship to the inner edge of said drum, a conveyer belt and a cooperative securing belt positioned to pass over the other drum in spaced relationship to the inner edge of said drum, said conveyer belts and securing belts being driven by the respective drums and disposed to permit positioning of a flattened thermoplastic tubing therebetween prior to passage through the zone wherein the peripheries of both drums lie in the same plane, a knife having its cutting edge disposed in said zone to sever the tubing fed past it into two cut sections, each section having its cut end protruding from the end of the drum for a predetermined length which is substantially uniform across the entire width of said section, a burner providing an open flame in the path of travel of the protruding end of the cut section on one drum, a second burner providing an open flame in the path of travel of the protruding end of the cut section on the other drum, an endless tape cooperating with one drum adjacent the inner edge thereof to restrict the action of the flame to the predetermined length of tubing exposed thereto, a second endless tape cooperating with the other drum adjacent the inner edge thereof to restrict the action of the flame to the predetermined length of tubing exposed thereto, said endless tapes passing on the respective drum in the zone wherein portions of both of the drums lie in the same plane and simultaneously with the conveyer and securing belts, means to remove each tape and each pair of conveyer and cooperative securing belts from the respective drum after the end closure has set, and means to separate each securing belt from each conveyer belt to permit discharge of the product.

BERNARD H. SCHENK.

REFERENCES CITED

The following references are of record in the file of this patent:

UNITED STATES PATENTS

| Number | Name | Date |
| --- | --- | --- |
| 1,940,560 | Moore | Dec. 19, 1933 |
| 2,367,725 | Lindh et al. | Jan. 23, 1945 |
| 2,379,361 | Bombard | June 26, 1945 |
| 2,379,500 | Steffens | July 3, 1945 |
| 2,380,914 | Billeb | Aug. 7, 1945 |
| 2,389,560 | Steffens | Nov. 20, 1945 |